UNITED STATES PATENT OFFICE 2,072,867

CHEMICAL PROCESSES AND NEW PRODUCTS PRODUCED THEREBY

Wallace H. Carothers, Fairville, Pa., assignor to E. I. du Pont de Nemours & Company, Wilmington, Del., a corporation of Delaware No Drawing. Application December 26, 1931, Serial No. 583,391

34 Claims. (Cl. 260—6)

This invention is concerned with the preparation of useful organic compounds and it pertains to many novel compounds and their transformation products. More particularly it is concerned with the preparation of substituted butadienes having the general formulas, $$CH_2=C-CH=CH_2 \text{ and } CH_2=C=CH-CH_2-R$$
$$\phantom{CH_2=C}|$$
$$\phantom{CH_2=C}R$$

in which R represents a hydrocarbon radical and with transformation products of these substituted butadienes.

It has been shown in a copending application of Carothers and Collins, Serial No. 490,538, filed October 22, 1930, that the addition of hydrogen chloride to vinylacetylene leads to the formation of unsaturated chlorine-containing products. Under properly controlled conditions one of the principal products of this reaction is the compound, chloro-4-butadiene-1,2.

$$CH_2=C=CH-CH_2Cl.$$

The reaction may be carried out by shaking liquid vinylacetylene with aqueous hydrogen chloride, or by passing gaseous vinylactylene into aqueous hydrogen chloride, and the chloro-4-butadiene-1,2 is readily separated by distillation from the isomeric compound, chloro-2-butadiene-1,3 which is also present in the reaction product. The reaction can be greatly accelerated by the addition of certain salts that function as catalysts. One of the most effective of these is cuprous chloride; but it also changes the ratio in which the two isomeric chlorocompounds are produced so that the product consists almost entirely of chloro-2-butadiene-1,3. Calcium chloride is a less powerful catalyst but it leaves the ratio of the two chlorocompounds unchanged, and makes possible good yields of chloro-4-butadiene-1,2.

Analogs of chloro-4-butadiene-1,2 such as bromo-4-butadiene-1,2 and iodo-4-butadiene-1,2 may also be prepared and used in the same manner as the chlorocompounds.

The present invention is concerned with the chemical transformation of halogen-4-butadienes-1,2. Thus chloro-4-butadiene-1,2 can readily be isomerized under the proper conditions to chloro-2-butadiene-1,3 which can be readily polymerized to produce rubber-like polymers. The transformation of chloro-4-butadiene-1,2 into chloro-2-butadiene-1,3 has been obsreved under a variety of conditions: by the action of powdered potassium hydroxide; by the action of hot quinoline (140–150°); by the action of heat (290°) in the presence of silica gel; and by the action of hot dilute hydrochloric acid. However, the isomerization occurred most smoothly and rapidly in the presence of hydrochloric acid containing cuprous chloride: Fifty grams of chloro-4-butadiene-1,2 was refluxed for 3½ hours with 20 g. of cuprous chloride in 100 cc. of 18% hydrochloric acid. The oily layer was decanted, dried, and distilled. The entire specimen except for a small amount of undistillable residue, came over between 59 and 63° and the distillate was pure chloro-2-butadiene-1,3. When the chloro-4-butadiene-1,2 was similarly treated with aqueous cuprous chloride alone it was recovered unchanged.

The invention is particularly concerned with the conversion of halogen-4-butadiene-1,2 by treating the same with organo-metallic compounds, such as organo-magnesium halides. The reaction is illustrated by the following typical equations:

$$CH_2=C=CH-CH_2Cl+RMgX=MgXCl+CH_2=C=CH-CH_2-R \quad (1)$$
$$CH_2=C=CH-CH_2Cl+RMgX=MgXCl+CH_2=C-CH=CH_2 \quad (2)$$
$$\phantom{CH_2=C=CH-CH_2Cl+RMgX=MgXCl+CH_2=C}|$$
$$\phantom{CH_2=C=CH-CH_2Cl+RMgX=MgXCl+CH_2=C}R$$

In general these reactions proceed simultaneously and the two products can be separated from each other by fractional distillation or other suitable means. However, the ratio in which the two different products is formed varies considerably depending upon the experimental conditions and the nature of the organo-metallic compound employed.

The dienes produced by the process of this invention are useful compounds. Those having the general formula indicated in the second of the above equations include isoprene and its homologs and analogs. These compounds can be polymerized with the formation of synthetic rubber. Very few analogs and homologs of isoprene are known, doubtless owing to the fact that no simple general methods are available for their synthesis. The method of the present invention makes such compounds readily available and it thus becomes possible to prepare a whole series of new synthetic rubbers. The 1,3-dienes represented in the formula of Equation (2) are also useful as intermediates in the preparation of other compounds and especially in the preparation of cyclic compounds. Thus they readily react with such reagents as maleic anhydride, benzoquinone, naphthoquinone, etc., with the formation of hydroaromatic compounds.

An object of the present invention pertains to methods for producing transformation products of holagen-4-butadiene-1,2. One object relates particularly to a general method for forming isoprene and its analogs and homologs. Another object relates to new and useful chemical compounds which are analogs or homologs of isoprene. A more specific object relates to the interaction of halogen-4-butadiene-1,2 and an organo-metallic compound, and to the novel products which may be produced by this reaction. A further object relates to the transformation of the new analogs and homologs of isoprene to substituted anthraquinones, and embraces the new products so produced. A further object pertains to the polymerization of the new analogs and homologs of isoprene to form synthetic rubber. Other objects will appear from the following detailed description of the invention.

The invention will be more particularly described with relation to the treatment of chloro-4-butadiene-1,2, since this compound is typical of the class of halogen-4-butadienes-1,2.

In carrying out the process of the present invention I mix the chloro-4-butadiene-1,2 with the organo-metallic compound under such conditions as to cause mutual reaction. I then isolate the reaction products by some method consistent with their properties, e. g., by fractional distillation. For example, I prepare an ethereal solution of an organo-magnesium halide (Grignard reagent) in a suitable vessel provided with a stirrer and a reflux condenser. I then add an equivalent amount of the chloro-4-butadiene-1,2 gradually with stirring. The mixture is then heated to boiling for a short time, cooled, treated with water and dilute acid, and the ethereal layer is separated, dried, and distilled. This part of the invention is fully illustrated in the following examples.

EXAMPLE 1

*Action of chloro-4-butadiene-1,2 on methyl magnesium iodide*

Methyl magnesium iodide was prepared in the usual manner by allowing 312 grams of methyl iodide to act on 53 grams of magnesium, suspended in 500 cc. of dibutyl ether in a flask, provided with a mechanical stirrer and a reflux condenser. After all the magnesium had reacted, 177 grams of chloro-4-butadiene-1,2 was slowly added to the mixture. Reaction proceeded smoothly with the evolution of considerable heat. After all the chloro-4-butadiene-1,2 had been added the mixture was heated to boiling for a short time, then cooled, and treated with dilute sulfuric acid. The ethereal layer was separated, dried over calcium chloride, and distilled through a fractionating column. Seventy-four grams of distillate was obtained boiling below the boiling point of dibutyl ether. This material on redistillation boiled almost entirely between 45° C. and 55° C. and consisted chiefly of isoprene. When distilled again through a fractionating column the isoprene was obtained in a state of purity as a liquid boiling at 34.5°–35° C.

Similar results were obtained by treating methyl magnesium chloride with chloro-4-butadiene-1,2.

EXAMPLE 2

*Action of chloro-2-butadiene-1,2 on butyl magnesium bromide*

Butyl magnesium bromide was prepared by the action of butyl bromide on magnesium in the presence of anhydrous ethyl ether. Six moles of butyl magnesium bromide obtained in this way was placed in a flask provided with a mechanical stirrer and a reflux condenser and five moles of chloro-4-butadiene-1,2 were slowly added. The reaction proceeded smoothly. The product was poured into ice water, acidified with sulfuric acid; the ether layer was separated, dried, and distilled through a fractionating column. The principal product obtained by distillation was a colorless liquid, boiling at 44°–45° C. at 49 mm. By means of its reaction with naphthoquinone it was shown to consist chiefly of butyl-2-butadiene-1,3. It was contaminated with some octane.

EXAMPLE 3

*Action of chloro-4-butadiene-1,2 on heptyl magnesium bromide*

Heptyl magnesium bromide was prepared by the action of heptyl bromide on magnesium in the presence of absolute ethyl ether. One mole of heptyl magnesium bromide was treated with one mole of chloro-4-butadiene-1,2 in the manner indicated in the preceding examples. The reaction mixture was washed with dilute acid and water, separated and distilled through a fractionating column. The principal product thus obtained was a colorless liquid, boiling at 52°–54° C. at 5 mm. This was shown to be heptyl-2-butadiene-1,3 by its composition and its reaction with naphthoquinone.

EXAMPLE 4

*Action of chloro-4-butadiene-1,2 on phenyl magnesium bromide*

Phenyl magnesium bromide was prepared by the action of bromobenzene on magnesium in the presence of absolute ethyl ether. Seven moles of phenyl magnesium bromide was treated in the manner indicated in the preceding examples with six moles of chloro-4-butadiene-1,2. The reaction mixture was washed with dilute acid, water, and dilute sodium hydroxide solution. The ethyl ether was removed by distillation and the residual material was distilled through a fractionating column. The product was thus separated into three principal fractions. The first of these was a colorless liquid boiling at 63°–63.5° C. at 11 mm., having a density at 20° C. of 0.942 and a refractive index $(n_D^{20})$ of 1.5489. This material was shown to be phenyl-2-butadiene-1,3 by its reaction with naphthoquinone.

The second product was a colorless liquid boiling at 74°–74.5° C. at .11 mm., and having a density at 20° C. of 0.9236 and a refractive index $(n_D^{20})$ of 1.5460. This material was shown to be phenyl-4-butadiene-1,2.

The third product was a viscous liquid boiling at 220°–225° C. at 10 mm. On cooling it solidified to a crystalline mass and after crystallization from methyl alcohol it was obtained in the form of white needles, melting sharply at 62° C. This material had the molecular formula $C_{20}H_{20}$, and was shown to be a dimer of phenyl-2-butadiene-1,3 as it was obtainable also from the product boiling at 63°–63.5° C. at 11 mm.

EXAMPLE 5

*Action of chloro-4-butadiene-1,2 on benzyl magnesium chloride*

Benzyl magnesium chloride was prepared by the action of benzyl chloride on magnesium in the presence of ether. One and five-tenths moles of benzyl magnesium chloride was treated with 1.15 moles of chloro-4-butadiene-1,2 in the manner indicated in the previous examples. The reaction mixture was washed with dilute acid and water, separated, dried, and distilled through a fractionating column. The principal product obtained in this way was a colorless liquid boiling at 72°–77° C. at 7 mm., having a density of about 0.92 at 20° C., and a refractive index $(n_D^{20})$ of 1.540. This product was shown to be benzyl-4-butadiene-1,2.

It is obvious that other organo-magnesium halides may be used in the process described above with similar results. The conditions under which the reaction is carried out may also be considerably varied without affecting the essential nature of the result. Other organo-metallic compounds, such as dialkyl and diaryl zinc compounds, alkyl zinc halides, alkyl and aryl aluminum compounds, etc., and in general organo-metallic compounds of elements above chromium in the electromotive series i. e., the alkali and alkaline earth metals, zinc, aluminum and magnesium can also be used to produce similar results. For the purpose of simplicity, the term "Grignard reagent" will be used to include both the organo-magnesium compounds and other similarly acting organo-metallic compounds.

All of the 2-substituted-1,3 butadienes other than the methyl substituted compound (isoprene) and the ethyl substituted compound which contain a hydrocarbon radical in the 2-position are novel, the compounds which have been specifically described, and the methods to produce them being typical of the whole class of novel compounds and their process of preparation. These analogs and homologs of isoprene include propyl-2-butadiene-1,3, butyl-2-butadiene-1,3 and the other analogs which contain, in the 2-position, hydrocarbon radicals having a higher number of carbon atoms, phenyl-2-butadiene-1,3, naphthyl-2-butadiene-1,3 and those analogs which contain other aromatic substituents in the 2-position, benzyl-2-butadiene-1,3 and analogs of isoprene which contain aryl-alkyl substituents other than benzyl in the 2-position, toluyl-2-butadiene-1,3 and related alkyl-aryl substituted butadienes; this class of new compounds is intended also to include those butadienes which contain organic radicals corresponding to those classes already described but which radicals contain therein a substituent other than hydrogen or carbon, e. g., alkoxy groups such as methoxy, ethoxy, etc., the organic radical which contains the alkoxy or other substituent being linked to the butadiene-1,3 nucleus, however, by one of the carbon atoms of the organic radical. The various hydrocarbon and substituted hydrocarbon substituents which may be contained in the 2-position are included under the general term "alkyl". This term has been accepted as being generic to both aliphatic and aromatic compounds (Beilstein 4th ed. vol. 1, p. 52). Wherever the term is used in the specification and claims it is intended that it be given this comprehensive meaning.

The 2-substituted-1,3 dienes obtained by the process of the present invention readily react with maleic acid, benzo-quinone, naphthoquinone, and other similar reagents to produce hydroaromatic compounds. This is illustrated in the following examples:

EXAMPLE 6

*Reaction between isoprene and naphthoquinone*

The isoprene prepared by the process described in Example 1 is mixed with an equal weight of naphthoquinone dissolved in alcohol and heated for 3½ hours at 100° C. in a sealed tube. On cooling the product solidifies to a bluish mass. After crystallization from alcohol it is obtained in the form of white crystals melting at 86° C. This material has the following formula:

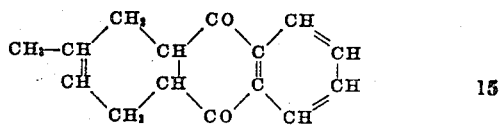

Methyl-2-tetrahydro-1,4,4a,9a-anthraquinone-9,10. In an alkaline solution it is readily oxidized by air with the formation of β-methylanthraquinone.

EXAMPLE 7

*Reaction between butyl-2-butadiene-1,3 and naphthoquinone*

A sample of the butyl-2-butadiene-1,3 described in Example 2 is mixed with an equal weight of naphthoquinone and the mixture is heated for 2 hours at 100° C. One thus obtains a crystalline product which after crystallization melts at 63°–64° C. This material has the following formula:

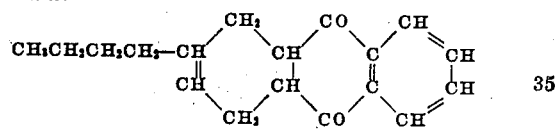

Butyl-2-tetrahydro-1,4,4a,9a-anthraquinone-9,10. It is a new compound.

When suspended in an alcoholic solution of potassium hydroxide and treated with a stream of air it is rapidly oxidized. One thus obtains the new compound, β-butylanthraquinone as a crystalline solid which after crystallization from alcohol melts at 89° C.

EXAMPLE 8

*Reaction between heptyl-2-butadiene-1,3 and naphthoquinone*

A sample of the heptyl-2-butadiene-1,3 described in Example 3 is mixed with an equal weight of naphthoquinone and heated for two hours at 90°–100° C. On cooling the liquid solidifies to a white mass. This is washed with methyl alcohol and recrystallized from acetone. It then melts at 81° C. It has the following formula:

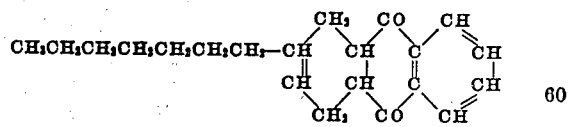

n-heptyl-2-tetrahydro-1,4,4a,9a-anthraquinone-9,10.

When suspended in an alcoholic solution of potassium hydroxide and treated with a stream of air for a few minutes it is oxidized to β-heptylanthraquinone. This is obtained as a solid which, after crystallization from alcohol, melts at 87° C., and is a new compound.

EXAMPLE 9

*Reaction between phenyl-2-butadiene-1,3 and naphthoquinone*

A sample of the phenyl-2-butadiene-1,3 described in Example 4 is mixed with an equal weight of naphthoquinone and heated at 90°–100° C. for 30 minutes. The reaction mixture solidifies spontaneously and after being washed with alcohol and recrystallized from acetone it melts at 146–147° C. This product has the formula indicated below:

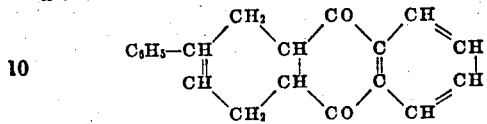

Phenyl-2-tearahydro-1,4,4a,9a-anthraquinone-9,10. It is a new compound.

When suspended in an alcoholic solution of potassium hydroxide and treated with a stream of air for a few minutes it is readily oxidized to the known compound, β-phenylanthraquinone. This is obtained as a solid which melts at 163°–164° C.

All of the substituted hydroanthraquinones produced by the interaction of naphthoquinone and alkyl-2-butadiene-1,3 are novel with the exception of methyl-2-tetrahydro-1,4,4a,9a-anthraquinone-9,10. All of the beta-substituted anthraquinones produced by oxidation of these products are new with the exception of β-phenylanthraquinone and β-methylanthraquinone.

Although particular attention has been given to the reaction of the alkyl-2-butadienes-1,3 with naphthoquinone, it will be understood that a similar reaction will occur generally with any compounds containing an activated carbon-carbon double bond. Examples of this latter class of compounds are alpha, beta-unsaturated acids and their esters and anhydrides such as maleic acid, maleic anhydride, diethyl maleate, fumaric acid, ethyl fumarate, acrylic acid, itaconic anhydride, and citraconic anhydride; alpha, beta-unsaturated aldehydes and ketones such as acrolein, and methyl vinyl ketone; and quinones such as benzoquinone and toluquinone.

The alkyl-2-substituted-1,3 dienes formed by the process of this invention can be converted into polymers resembling rubber. The polymerization may be brought about by various methods already described in the copending application of Carothers and Collins, concerning the formation of rubber-like polymers from chloro-2-butadiene-1,3. Thus, the novel 2-substituted-1,3 dienes may be polymerized under pressure, under exposure to light, under the influence of heat, by the catalytic effect of polymerization accelerators, in the presence of oxygen, etc., to produce materials resembling natural rubber, and especially desirable products may be obtained by emulsifying the dienes with water and polymerizing these aqueous emulsions.

The novel 2-substituted-1,3 dienes may be polymerized under conditions which make it possible to control the formation of a plastic polymer resembling Hevea rubber, which plastic polymer may be subsequently cured to give an elastic material resembling vulcanized rubber. Thus, a sample of phenyl-2-butadiene-1,3 was submitted to a pressure of 6000 atmospheres for 18 hours at 25° C. It was transformed to a soft, transparent, colorless, plastic, rubber-like mass. This was compounded by mixing it with zinc oxide, stearic acid, sulfur, and tetramethyl thiuramdisulfide and the resulting compound was heated at 140° C. for 15 minutes. It was thus transformed into a mass resembling vulcanized rubber.

A sample of heptyl-2-butadiene-1,3 was submitted to a pressure of 5000 atmospheres at 25° C. for 62 hours. It was thus transformed into a soft mass consisting of about equal parts of unchanged heptylbutadiene and polymerized heptylbutadiene. The unchanged heptylbutadiene was removed by heating the mixture for a short time. The residue consisted of a soft, sticky, plastic, rubber-like mass. It was compounded by mixing it with zinc oxide, stearic acid, sulfur, and tetramethyl-thiuramdisulfide. The resulting compound was placed in a mold and heated at 135° C. for 5 hours. The resulting product resembled vulcanized rubber.

The formation of a plastic polymer from the 2-substituted-1,3 dienes is assisted by the use of normal room temperature and a pressure of several thousand atmospheres, the reaction being stopped at a point where a substantial amount of the substituted butadiene still remains unpolymerized, the plastic polymer being obtained by distilling off the unchanged monomer or by precipitating the polymer by adding alcohol, or by an equivalent expedient. The curing of the plastic polymer is effected by the use of elevated temperatures above 100° C. and preferably by the use of a curing agent such as zinc oxide.

The polymerization of the 2-substituted-butadienes-1,3 is considerably accelerated by the use of elevated temperatures. Thus, a sample of heptyl-2-butadiene-1,3 when submitted to a pressure of 5000 atmospheres for 46 hours at 53° C. was practically completely converted into an elastic non-plastic rubber-like polymer.

The 2-substituted-1,3 dienes prepared by the method of the present invention can also be converted into other types of polymers. Thus, phenyl-2-butadiene-1,3 under the action of heat at ordinary pressure is readily converted into the crystalline dimer $C_{20}H_{20}$ already described in Example 4.

The alkyl-4-substituted-1,2 dienes produced in accordance with the reaction typified by Equation 2 on page 2, are generally formed simultaneously with the alkyl-2-substituted-1,3 dienes. Thus, in Example 4, phenyl-4-butadiene-1,2 is formed together with phenyl-2-butadiene-1,3, and in Example 5 benzyl-4-butadiene-1,2 was formed as the principal product. Usually the 4-substituted isomer is formed as a minor product during the reaction which produces the 2-substituted isomer.

While the invention has been most particularly described with respect to the treatment of chloro-4-butadiene-1,2, other corresponding halogen-4-butadienes-1,2, e. g., bromo-4-butadiene-1,2 and iodo-4-butadiene-1,2 may be reacted in like manner.

The above description and specific examples are to be taken as illustrative only and not as limiting the scope of the invention. Any modification or variation therefrom which conforms to the spirit of the invention is intended to be included within the scope of the claims.

I claim:

1. As a new compound, phenyl-2-butadiene-1,3.

2. As a new compound, a compound of the formula

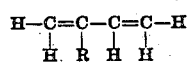

in which R is an aryl radical.

3. A process for preparing 2-substituted-butadienes which comprises reacting a halogen-4-butadiene-1,2 with an organo-metallic compound of an element above chromium in the electromotive series which organo-metallic compound is a Grignard reagent and in which organometallic compound the metal is attached to one of the carbon atoms of the organo radical.

4. A process for preparing 2-substituted-butadienes which comprises reacting a halogen-4-butadiene-1,2 with a Grignard reagent comprising an alkyl-magnesium halide.

5. A process for preparing 2-substituted-butadienes which comprises reacting a halogen-4-butadiene-1,2 with a Grignard reagent containing an aliphatic radical.

6. A process for preparing 2-substituted-butadienes which comprises reacting a halogen-4-butadiene-1,2 with a Grignard reagent containing an aromatic radical.

7. A process for preparing 2-substituted-butadienes which comprises reacting a halogen-4-butadiene-1,2 with a Grignard reagent containing the phenyl radical.

8. The process of claim 3 in which the halogen atom of the halogen-4-butadiene-1,2 is chlorine.

9. A polymer of 2-phenyl-butadiene-1,3.

10. A process for preparing alkyl-2-butadienes-1,3 which comprises reacting a halogen-4-butadiene-1,2 with an alkyl-metallic compound of an element above chromium in the electromotive series.

11. A process for preparing a compound of the formula $$CH_2=C(R)-CH=CH_2$$

where R is a monovalent hydrocarbon radical, which comprises reacting a halogen-4-butadiene-1,2 with a compound of the formula R—Mg—X where R is a monovalent hydrocarbon radical and X is halogen.

12. A process for preparing a compound of the formula $$CH_2=C(R)-CH=CH_2$$

where R is a monovalent hydrocarbon radical, which comprises reacting 4-chlorobutadiene-1,2 with a compound of the formula R—Mg—X where R is a monovalent hydrocarbon radical and X is halogen.

13. A process for preparing a 2-alkylbutadiene-1,3 which comprises reacting 4-chlorobutadiene-1,2 with an alkyl magnesium halide.

14. A process for preparing isoprene which comprises reacting 4-chlorobutadiene-1,2 with a methyl magnesium halide, acidifying, and separating the isoprene by distillation.

15. A process for preparing a 2-arylbutadiene-1,3 which comprises reacting 4-chlorobutadiene-1,2 with an aryl magnesium halide.

16. A process for preparing 2-phenylbutadiene-1,3 which comprises reacting 4-chlorobutadiene-1,2 with a phenyl magnesium halide, acidifying, and separating the 2-phenylbutadiene-1,3 by distillation.

17. A polymer of a compound of the formula $$CH_2=C(R)-CH=CH_2$$

where R is an aryl radical

18. A polymer of a compound of the general formula

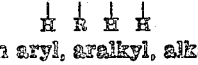

in which R is an aryl, aralkyl, alkaryl or alicyclic hydrocarbon radical.

19. The process which comprises polymerizing a compound of the general formula

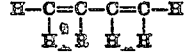

in which R is an aryl, aralkyl, alkaryl or alicyclic hydrocarbon radical.

20. A polymer as described in claim 18 characterized in that it is plastic.

21. A polymer as described in claim 18 characterized in that it is elastic.

22. The process which comprises polymerizing a compound of the general formula

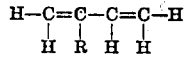

in which R is an aryl, aralkyl, alkaryl or alicyclic hydrocarbon radical and stopping the polymerizing at a point where a substantial portion of the polymer is in the plastic form.

23. The process which comprises polymerizing a compound of the general formula

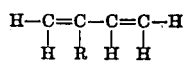

in which R is an aryl, aralkyl, alkaryl or alicyclic hydrocarbon radical and stopping the polymerizing at a point where a substantial portion of the polymer is in the plastic form and then further polymerizing the plastic polymer.

24. As a new compound, benzyl-2-butadiene-1,3.

25. A polymer of benzyl-butadiene-1,3.

26. A polymer as described in claim 17 further characterized in that it is plastic.

27. A polymer as described in claim 9 further characterized in that it is plastic.

28. A polymer as described in claim 25 further characterized in that it is plastic.

29. The process which comprises polymerizing phenyl-2-butadiene-1,3.

30. The process which comprises polymerizing a compound of the general formula

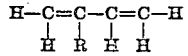

in which R is an aryl radical.

31. The process which comprises polymerizing benzyl-2-butadiene-1,3.

32. The process for preparing a compound of the formula $$CH_2=C(R)-CH=CH_2$$

where R is a monovalent aliphatic hydrocarbon radical, which comprises reacting a halogen-4-butadiene-1,2 with a compound of the formula R—Mg—X where R is a monovalent aliphatic hydrocarbon radical and X is halogen.

33. The process for preparing a compound of the formula $$CH_2=C(R)-CH=CH_2$$

where R is a monovalent hydrocarbon radical which comprises reacting chloro-4-butadiene-1,2 with an ethereal solution of a compound of the formula R—Mg—X where R is a monovalent hydrocarbon radical and X is halogen, acidifying with dilute sulfuric acid and then separating the product from the ethereal layer by fractional distillation.

34. The process for preparing isoprene which comprises reacting 4-chlorobutadiene-1,2 with an ethereal solution of methyl magnesium halide, acidifying with dilute sulfuric acid and separating the isoprene from the ethereal layer by fractional distillation.

WALLACE H. CAROTHERS.